S. S. CONNOR.
EVAPORATING-PAN.

No. 178,047. Patented May 30, 1876.

WITNESSES:
Francis J. McArdle
John Goethals

INVENTOR:
S. S. Connor
BY
ATTORNEYS.

UNITED STATES PATENT OFFICE.

SYDNEY S. CONNOR, OF AMITE CITY, LOUISIANA.

IMPROVEMENT IN EVAPORATING-PANS.

Specification forming part of Letters Patent No. 178,047, dated May 30, 1876; application filed February 14, 1876.

*To all whom it may concern:*

Be it known that I, SYDNEY S. CONNOR, of Amite City, in the parish of Tangipahoa and State of Louisiana, have invented a new and Improved Evaporating-Pan, of which the following is a specification:

The invention consists in the improvement in evaporating-pans by providing them with detachable partitions having angle-bars, as hereinafter more fully described.

Figure 1:
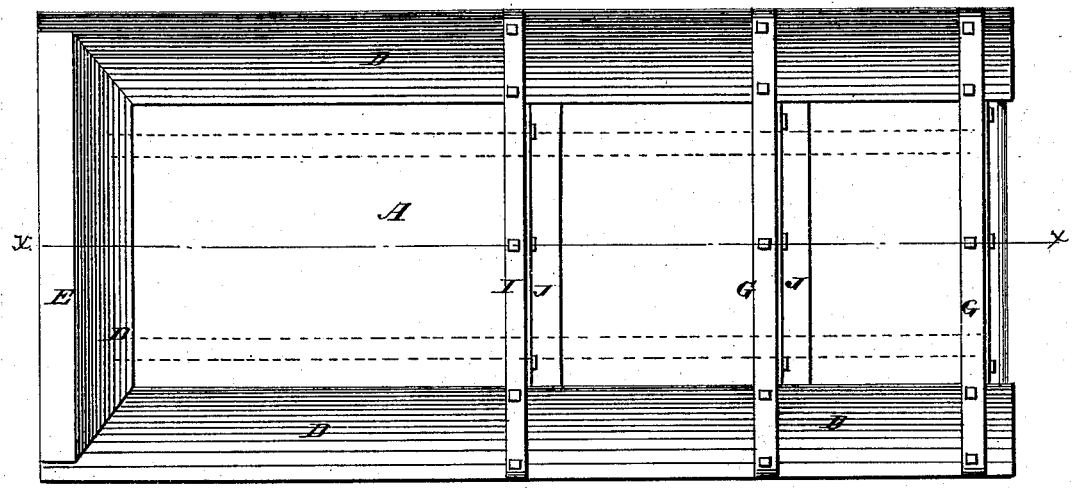
Figure 2:
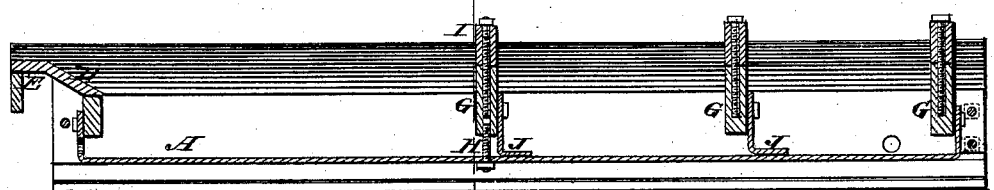
Figure 3:
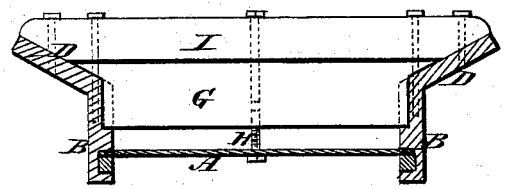
Figure 4:
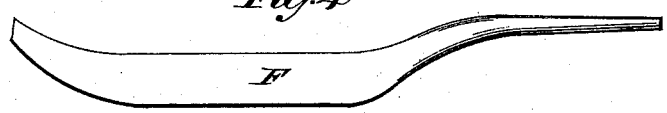

Figure 1 is a plan view of my improved evaporating-pan. Fig. 2 is a sectional elevation taken on line $x\ x$ of Fig. 1. Fig. 3 is a transverse section taken on line $y\ y$ of Fig. 2; and Fig. 4 is a side elevation of a sweep or scraper, such as is used for skimming the sirup.

Similar letters of reference indicate corresponding parts.

A is the sheet-metal bottom of the pan to set over the fire; B, the vertical sides, of wood, which are protected in the brick-work; D, the upper portion of the sides, which I make flaring or widening outward, to increase the area of the sirup at the surface, so that the elevations in the middle portion, caused by boiling, will subside to the true level by flowing therefrom outwardly on these flaring sides, thus preventing the boiling over of the sirup; also, for enlarging the surface, to facilitate the skimming.

E represents the depressed end portion of the pan, over which the scum is to be discharged by scraping it off with the sweep F. G represents partitions, that may be used for separating the pan into different divisions, when it may be desirable to work by first boiling the sirup to a certain extent in a large division, and then transferring it to a smaller one. The lower portion of the middle partition is permanently attached, and the bottom A is supported by it with a connecting-bolt, H; but the upper portion I is removable, for allowing the sirup to flow over it when the whole pan is to be used as one section. The permanent portion of this partition is for bracing the frame of the pan and supporting the bottom, as above stated.

With each partition is an angle-shaped bar, J, to make tight connection with the bottom by soldering or riveting to it, the same to be detached when the whole pan is to be used in one section.

Having thus described my invention, I claim as new and desire to secure by Letters Patent—

An evaporating-pan having detachable partitions G, provided with the angle-bars J, for the purpose specified.

SYDNEY S. CONNOR.

Witnesses:
STEPHEN D. ELLIS,
C. E. VANTLATEN.